Figure 2:
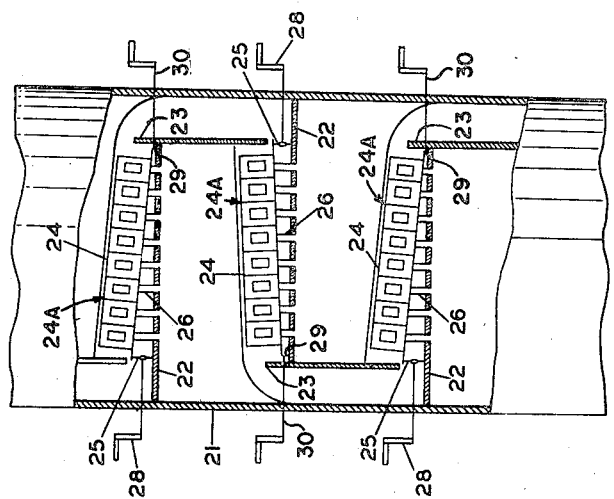

Jan. 23, 1951     C. S. KELLEY ET AL     2,539,142

CONTACTING APPARATUS

Filed Feb. 10, 1947

INVENTORS
C. S. KELLEY
S. D. LAWSON

BY Hudson & Young

ATTORNEYS

Patented Jan. 23, 1951

2,539,142

UNITED STATES PATENT OFFICE 2,539,142

CONTACTING APPARATUS

Carl S. Kelley and Shelby Dayton Lawson, Bartlesville, Okla., assignors to Phillips Petroleum Company, a corporation of Delaware Application February 10, 1947, Serial No. 727,550

2 Claims. (Cl. 261—114)

This invention relates to bubble cap fractionators. In one of its more specific aspects it relates to fractionator tray construction and placement of bubble caps on the trays to assist in improving the distribution of vapors rising through the bubble caps.

In bubble cap type fractionator columns are decks or trays, usually arranged horizontally, and upon which are placed the bubble caps. The number of bubble caps on each tray is of course a function of the area of the tray, of the spacing pattern and distance from one another. Trays are also provided with overflow pipes or downspouts to permit flow of liquid from one tray to the tray next below. The downspouts are usually staggered with respect to the trays so that liquid reaching a given tray on one side will flow across the tray and then pass downward to the next tray and so on all the way down a fractionator. Such columns may have only a half dozen trays or even less for service requiring only little fractionation, while other columns may have 100 or more trays for separation of close-boiling components of a mixture. Some fractionators have so many trays that it is necessary to divide a fractionator into two sections, with both sections sitting on the ground.

In operating fractionating columns of this type it is necessary that a differential in liquid head be maintained on a tray in order to obtain liquid flow across the tray. The depth of liquid on a tray is greatest at the point where the liquid is admitted to the tray while the depth is least at the point where it leaves the tray. It has been frequently found that vapors pass through the bubble caps in the vicinity of the downspout where the depth of liquid is least. Where some bubble caps on a tray are active and others are inactive, it is obvious that the efficiency of a fractionator is adversely affected.

One object of our invention is to provide an improved bubble cap tray assembly for use in fractionating or other countercurrent vapor-liquid contacting vessels.

Another object of our invention is to provide a bubble cap tray assembly which will permit uniform or substantially uniform passage of vapors over the entire area of the tray.

Still another object of our invention is to provide a bubble cap tray assembly wherein irregularities in operation caused by the hydraulic gradient of liquid flowing across the tray are compensated for.

Still other objects and advantages will be realized by those skilled in the art by a careful study of the following disclosure and drawing which describes and illustrates respectively our invention.

Figure 1:
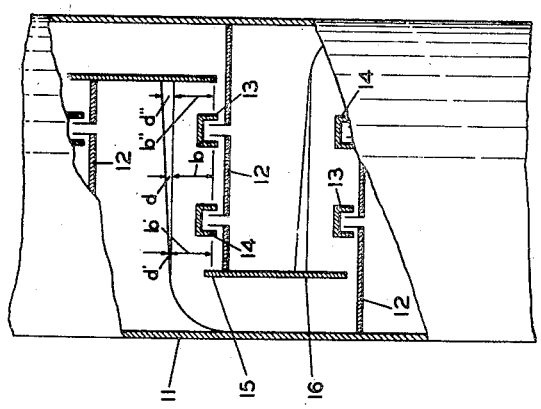

Figure 1 of the drawing illustrates the normal condition of hydraulic gradient existing in a bubble cap arrangement of a bubble cap tower of common design in which horizontal bubble trays are used.

Figure 2 illustrates one embodiment of our bubble cap-tray arrangement.

It is known that a level tray in a fractionating column has the disadvantage of giving unequal distribution of vapors rising through the tray, due to the differential liquid head across the tray. An indication of this differential may be noted upon reference to Figure 1 of the drawing. There is a pressure drop through each tray during the time a fractionator is in operation and accordingly the vapor under one tray will be at a higher pressure than the vapor over the same tray.

This pressure drop may be represented by the symbol $\Delta P$, and the pressure drop, $\Delta P$, is equal to $P_{n-1} - P_n$, and must be equal at every opening in a tray wherein $n$ is any tray and $n-1$ is the next lower tray.

Vapor passing through an opening in a tray is conducted upward through a chimney to the space under the closed section of a bubble cap, from which the vapor passes downward and outward through perforations or slots in the lower walls of the cap and then upward through the body of liquid resting on the tray.

To obtain uniform distribution of vapor passing upward through a tray, each of the tray openings with its chimney, bubble cap and depth of liquid directly over the cap must be equal in resistance to vapor flow or have equal pressure drop therethrough. If through one opening this pressure drop summation is less than through a second opening, a proportionally larger volume of vapor will pass through this opening than will pass through the second opening.

In Figure 1 of the drawing the sides of a fractionator tower are represented by reference numerals 11. Trays 12 in this tower carry for exemplary purposes two bubble caps 13 and 14, and each tray has an overflow weir 15 and a downcomer spout 16.

For explanatory purposes we have shown, in Figure 1, a $d''$ and $b''$ for conditions adjacent the bubble cap 13, and $d'$ and $b'$ for conditions adjacent the bubble cap 14, which reference numerals will be explained herein below.

The principle of uneven distribution may be seen by comparison of the pressure drops across openings at opposite ends of a tray. Upon reference to Figure 1 of the drawing, at any opening $\Delta P = P_s + P_b + P_d$, where $P_s$ is the pressure drop equivalent to the friction of vapor flowing through the opening in the tray and through the bubble cap, and $P_b$ is the hydrostatic pressure drop due to the head $b$ of liquid on the tray from the vapor opening in the bubble cap to a plane parallel to the tray with said plane being fixed by the height of the weir and the crest of liquid over the weir necessary for flow over the weir. $P_d$ is the hydrostatic pressure drop which is due to the hydraulic gradient head $d$ of liquid across the tray necessary to promote flow of liquid across the tray and over the weir. $P_d$ is also a function of the distance from the overflow weir. At the weir $P_d$ is zero and at the entrance to a tray from the tray above, $P_d$ is a maximum. At the downstream bubble cap 14, $\Delta P' = P_{s'} + P_{b'} + P_{d'}$ and at the upstream bubble cap 13 $\Delta P'' = P_{s''} + P_{b''} + P_{d''}$. Since $P_{b'} = P_{b''}$ and $\Delta P' = \Delta P''$, then $$P_{s'} + P_{d'} = P_{s''} + P_{d''}$$

On any tray $P_{s'}$ or $P_{s''}$, for any given cap and slot is a function of the velocity of the vapor passing through the cap. The magnitudes of the pressure drops $P_{s'}$ and $P_{d''}$ for many fractionators are about the same, and often $P_{d''}$ is larger than $P_{s'}$. For such a case in which $P_{s'}$ equals $P_{d''}$, $P_{d'}$ for the downstream cap is very small or may be nearly zero, and under such conditions, therefore $P_{s''}$ must be very small or nearly zero. When $P_{s''}$ equals zero, then there is no vapor flow through the upstream cap 13. As $P_{d''}$ for the cap farthest away from the overflow weir 15 becomes larger than $P_{s'}$, more caps become inactive. When $P_{s'}$ is only slightly larger than $P_{d''}$, some vapor will flow through cap 13 but a greater volume will flow through the cap 14.

Numerous methods have been devised for correcting irregularities in the flow of vapors through bubble caps due to the liquid gradient across the tray, each solution to the problem has also presented disadvantages. One method which is known is to increase the pressure drop through the cap assembly to make $P_{s'}$ larger than $P_{d''}$. $P_{s''}$ may then be approximately equal to $P_{s'}$ and nearly uniform distribution results, but, however, this procedure results in an often prohibitive pressure drop from tray to tray. Another method is to install a series of small cascaded trays each of which has an overflow weir in place of the one large conventional tray. The gradient is almost negligible across each tray section and therefore $P_{d''}$ is small and $P_{s'}$ is nearly equal to $P_{s''}$ and good vapor distribution is obtained. Split flow trays also fall into this class of trays. However, for large diameter towers, many "steps" on a tray are necessary to improve distribution in an efficient manner. The use of this type of tray greatly increases the cost of the fractionation column due to the complicated construction of the trays, and also a greater space between trays is necessary due to the steps, and a taller tower is necessary to have a given number of trays.

Various types of caps have been suggested which lower the resistance to flow of liquid across the tray, which in turn makes $P_{d''}$ smaller and improves the vapor distribution to some extent but often at the expense of decreased mixing of liquid and vapor on the tray. Decreased mixing or contacting of liquid and vapor markedly limits tray efficiency.

Another method of improving distribution is to install trays in such a manner that they are inclined, so as to make $P_{d''}$ small. A sloping tray is no more flexible than a horizontal one, and will not operate at full efficiency except under one condition of flow.

We have discovered that by placing bubble caps on a tray in such a manner that caps farthest away from the overflow weir are raised off the tray more than the caps closest to the weir, and the caps between these two extremes are raised to heights proportional to their distances from the weir, gradient across the trays may be compensated for.

The caps may be fixed to the tray in such a manner that the distance which the caps are raised may be changed rapidly and easily when a change in flow, load, or service so justifies. The height to which the caps are to be set may be found by observation through glass ports in the tower, tests on experimental trays, or by calculations.

Figure 2 of the drawing illustrates diagrammatically one embodiment of our invention, in which reference numerals 21 represent walls of a fractionator vessel. Horizontally disposed bubble cap trays 22 are equipped with weirs or downspouts 23, the height of which above a tray level determines the depth of liquid on the tray. The lower end or skirt portion of the weir member 23 is sufficiently long to extend into the liquid on the next lower tray to make a "liquid seal" so that vapors cannot bypass to the next higher vapor space.

Some bubble caps 24, may be individual bubble caps as are ordinarily used in countercurrent contacting towers, or may be elongated sections 24A consisting, in effect, of a plurality of connected caps. For the purpose of our invention whether the caps are individual or are elongated multiple cap sections is immaterial. We have indicated, for illustrative purposes, the individual caps 24 and the multiple cap sections 24A in Figure 2 of the drawing.

When such multiple cap sections are used, the cap section may be fixed to the tray at a point adjacent the weir 23 in such a manner that the opposite end may be raised or lowered. At point 25 the cap section has means for raising or lowering that end of the section. If desired, this raising or lowering means 28 may extend through the wall 21 of the fractionator in such a manner that the cap section at point 25 may be raised or lowered from outside the tower, and even while the fractionator is in operation.

Each multiple cap section may carry numerous lateral partitions to give the effect of many individual bubble caps. Under each of these "individual" caps extends a riser or vapor chimney 26, for passage of vapors from the vapor space below one tray through the tray to the space under the closed dome of a bubble cap. The distance these risers 26 extend into the bubble cap is not critical and the caps may be adjusted downward or upward an inch or two without interference with vapor flow through the risers. However, the closed dome of the cap must not be permitted to be too close to the open end of the riser or the vapor flow rate may be reduced.

The actual gradient across the surface of the liquid on a tray is not great, for example, when the liquid level at the downcomer end of a tray is 4 inches higher than the liquid level at the weir end, flow across the tray is quite rapid in spite of the resistance to flow offered by rising vapors. Thus the adjustable ends of the multiple cap sections need be raised a maximum of about 4 inches.

Conventional operating conditions, that is, normal throughput capacity, may require from 2" to 3" gradient, then subsequent adjustment may be made from these values accordingly as capacity is increased or decreased.

Our type of tray and cap arrangement has special importance in fractionators carrying large liquid throughputs, and in vacuum fractionators as in lubricating oil plants in which high tray efficiency and minimum pressure drop from tray to tray is essential.

As a further improvement over the prior art, the end of a multiple cap section adjacent a weir may be installed on a tray in such a manner that it, too, may be raised and lowered, depending upon the depth of liquid on a tray and upon the liquid throughput across a tray. In this manner the multiple cap sections may be adjusted so as to slope and as to total height thus permitting very close control. To this end, each elongated bubble cap section 24A is provided with a vertically-extensible member 29 positioned between the tray 22 and the adjacent end of the bubble cap section, this vertically-extensible member being operable by a crank 30 which extends through the wall of the fractionating column and through the adjacent weir 23.

The particular type of bubble caps or multiple cap sections for use according to our invention may be of any good design and need not be limited to a particular design. The use of the multiple cap sections, as herein disclosed, permit use of mechanisms wherein the cap sections may be adjusted from outside the tower and while the fractionator is in operation. If desired a "look" glass may be installed above each tray through which an operator may look to determine whether vapor distribution over the entire area of a tray is uniform or not. If it is not, then the cap sections may be lowered or raised, as desired, to obtain uniform vapor distribution.

Materials of construction may be selected from among those commercially available, which are suited to the conditions for a particular service. Cast iron or cast steel caps may be used in petroleum service while for fractionating corrosive materials, of course corrosion resistant materials should be used. When using the multiple cap sections, the sections should be strong enough to support their own weight.

As will be seen by those skilled in the art, many variations and modifications of our invention may be practiced and yet remain within the intended spirit and scope of our invention.

Having disclosed our invention, we claim:

1. In a column for effecting countercurrent contacting of a liquid and a vapor, in combination, a plurality of bubble cap trays each including a generally horizontally disposed support, a series of riser sections carried by said support, each section including a plurality of spaced riser structures arranged in generally linear formation, means for admitting liquid from an adjacent upper tray to said support at one end of said series of risers, means including a weir for withdrawing liquid from said support at the other end of said series of risers whereby there is a progressive decrease in liquid level proceeding from the inlet end of said series of risers to the outlet end thereof, the amount of such decrease in liquid level being determined by the feed rate, vapor velocity, and composition of the materials passing through the tray, a plurality of multiple cap sections, one for each riser section, each cap section including a bubble cap superimposed upon each riser of a corresponding riser section, a pivotal mounting at the end of each cap section adjacent said weir, a vertically-extensible member positioned between said support and the other end of each cap section, a rotatable shaft secured to each extensible member so as to vary the length thereof and thereby change the slope of the corresponding bubble cap section, each shaft extending through the wall of said column, and means disposed outside said column to rotate each shaft, whereby the slope of each cap section may be varied to correspond to the progressive decrease in liquid level between the two ends of the cap section.

2. In a column for effecting countercurrent contacting of a liquid and a vapor, in combination, a plurality of bubble cap trays each including a generally horizontally disposed support, a series of riser sections carried by said support, each section including a plurality of spaced riser structures arranged in generally linear formation, means for admitting liquid from an adjacent upper tray to said support at one end of said series of risers, means including a weir for withdrawing liquid from said support at the other end of said series of risers whereby there is a progressive decrease in liquid level proceeding from the inlet end of said series of risers to the outlet end thereof, the amount of such decrease in liquid level being determined by the feed rate, vapor velocity, and composition of the materials passing through the tray, a plurality of multiple cap sections, one for each riser section, each cap section including a bubble cap superimposed upon each riser of a corresponding riser section, a vertically-extensible member positioned between said support and the end of each cap section adjacent said weir, a shaft secured to each extensible member to vary the length thereof and thereby change the vertical position of said end of the cap section, each shaft extending through the wall of said column, means disposed exteriorly of said column for rotating each shaft, a second vertically-extensible member positioned between said support and the other end of each multiple cap section, a second shaft secured to each second extensible member to vary the length thereof and thereby adjust the vertical position of said other end of each cap section, each second shaft extending through the wall of said column, and means disposed exteriorly of said column for rotating each second shaft, whereby the slope of each cap section may be individually adjusted and the vertical distance between each cap section and said support may also be adjusted.

CARL S. KELLEY.
SHELBY DAYTON LAWSON.

REFERENCES CITED

The following references are of record in the file of this patent:

UNITED STATES PATENTS

| Number | Name | Date |
| --- | --- | --- |
| 1,811,247 | Smith | June 23, 1931 |
| 1,893,906 | Primrose et al. | Jan. 10, 1933 |
| 2,218,993 | Rupp et al. | Oct. 22, 1940 |
| 2,288,958 | Smith | July 7, 1942 |
| 2,374,950 | Packie | May 1, 1945 |